(12) United States Patent
Jaradi et al.

(10) Patent No.: US 10,752,203 B2
(45) Date of Patent: Aug. 25, 2020

(54) SEATBELT ASSEMBLY

(71) Applicant: Ford Global Technologies, LLC, Dearborn, MI (US)

(72) Inventors: Dean M. Jaradi, Macomb, MI (US); Mohammad Omar Faruque, Ann Arbor, MI (US); S. M. Iskander Farooq, Novi, MI (US); Zhenyan Gao, Northville, MI (US); James Chih Cheng, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 293 days.

(21) Appl. No.: 15/835,368

(22) Filed: Dec. 7, 2017

(65) Prior Publication Data

US 2019/0176749 A1 Jun. 13, 2019

(51) Int. Cl.
| | |
|---|---|
| *B60R 22/195* | (2006.01) |
| *B60R 22/20* | (2006.01) |
| *B60R 21/0136* | (2006.01) |
| *B60R 21/015* | (2006.01) |
| *B60R 21/00* | (2006.01) |
| *B60R 21/01* | (2006.01) |

(52) U.S. Cl.
CPC ...... *B60R 22/1954* (2013.01); *B60R 21/0136* (2013.01); *B60R 21/01544* (2014.10); *B60R 22/1952* (2013.01); *B60R 22/20* (2013.01); *B60R 22/206* (2013.01); *B60R 2021/0009* (2013.01); *B60R 2021/0044* (2013.01); *B60R 2021/0053* (2013.01); *B60R 2021/01272* (2013.01); *B60R 2022/208* (2013.01)

(58) Field of Classification Search
CPC .............. B60R 22/1954; B60R 22/195; B60R 22/1952; B60R 22/206; B60R 22/20; B60R 22/1951; B60R 21/0136; B60R 21/01544; B60R 2021/0009; B60R 2021/0053; B60R 2021/01272; B60R 2021/0044; B60R 2022/208
See application file for complete search history.

(56) References Cited

U.S. PATENT DOCUMENTS

| | | | |
|---|---|---|---|
| 6,149,242 A * | 11/2000 | Pesta ................... | B60R 22/1952 280/806 |
| 6,863,308 B2 | 3/2005 | Motozawa | |
| 7,516,987 B2 * | 4/2009 | Koide ................. | B60R 22/1951 280/801.1 |
| 7,967,339 B2 | 6/2011 | Usoro et al. | |
| 9,637,083 B2 | 5/2017 | Schlittenbauer et al. | |

(Continued)

FOREIGN PATENT DOCUMENTS

| | | |
|---|---|---|
| DE | 102011109562 A1 | 2/2013 |
| GB | 2433475 B | 4/2009 |

*Primary Examiner* — Paul N Dickson
*Assistant Examiner* — Kurtis Nielson
(74) *Attorney, Agent, or Firm* — Frank A. MacKenzie; Bejin Bieneman PLC

(57) ABSTRACT

An assembly includes a base and a seatbelt anchor. The seatbelt anchor has a first end defining a circular hole pivotally supported by the base and a second end fixed in position relative to the first end. The assembly includes a buckle fixed in position relative to the second end. The assembly includes a pyrotechnic actuator secured to the base. The assembly includes a connector extending from the pyrotechnic actuator to the seatbelt anchor.

15 Claims, 5 Drawing Sheets

(56) References Cited

U.S. PATENT DOCUMENTS

| | | | |
|---|---|---|---|
| 2004/0232670 A1* | 11/2004 | Devereaux | B60R 22/18 |
| | | | 280/735 |
| 2004/0256850 A1* | 12/2004 | Yamaguchi | B60R 22/195 |
| | | | 280/806 |
| 2013/0299620 A1* | 11/2013 | Miyoshi | B60R 22/1952 |
| | | | 242/374 |
| 2014/0035268 A1* | 2/2014 | Naganuma | B60R 22/195 |
| | | | 280/807 |
| 2015/0274116 A1* | 10/2015 | Jaradi | B60R 21/0136 |
| | | | 701/45 |
| 2016/0221525 A1* | 8/2016 | Weerappuli | B60R 21/08 |
| 2019/0106081 A1* | 4/2019 | Hayashi | B60R 21/0134 |

* cited by examiner

SEATBELT ASSEMBLY

BACKGROUND

The seatbelt portion of a vehicle restraint system secures an occupant of a vehicle against harmful movement that may result from a vehicle collision. The seatbelt functions to reduce the likelihood of injury by reducing the force of occupant impacts with vehicle interior structures. In this role, the seatbelt applies loads across the chest or lap of the occupant. Controlling or reducing these loads may reduce the risk of occupant injury during a collision.

DETAILED DESCRIPTION

Figure 1:
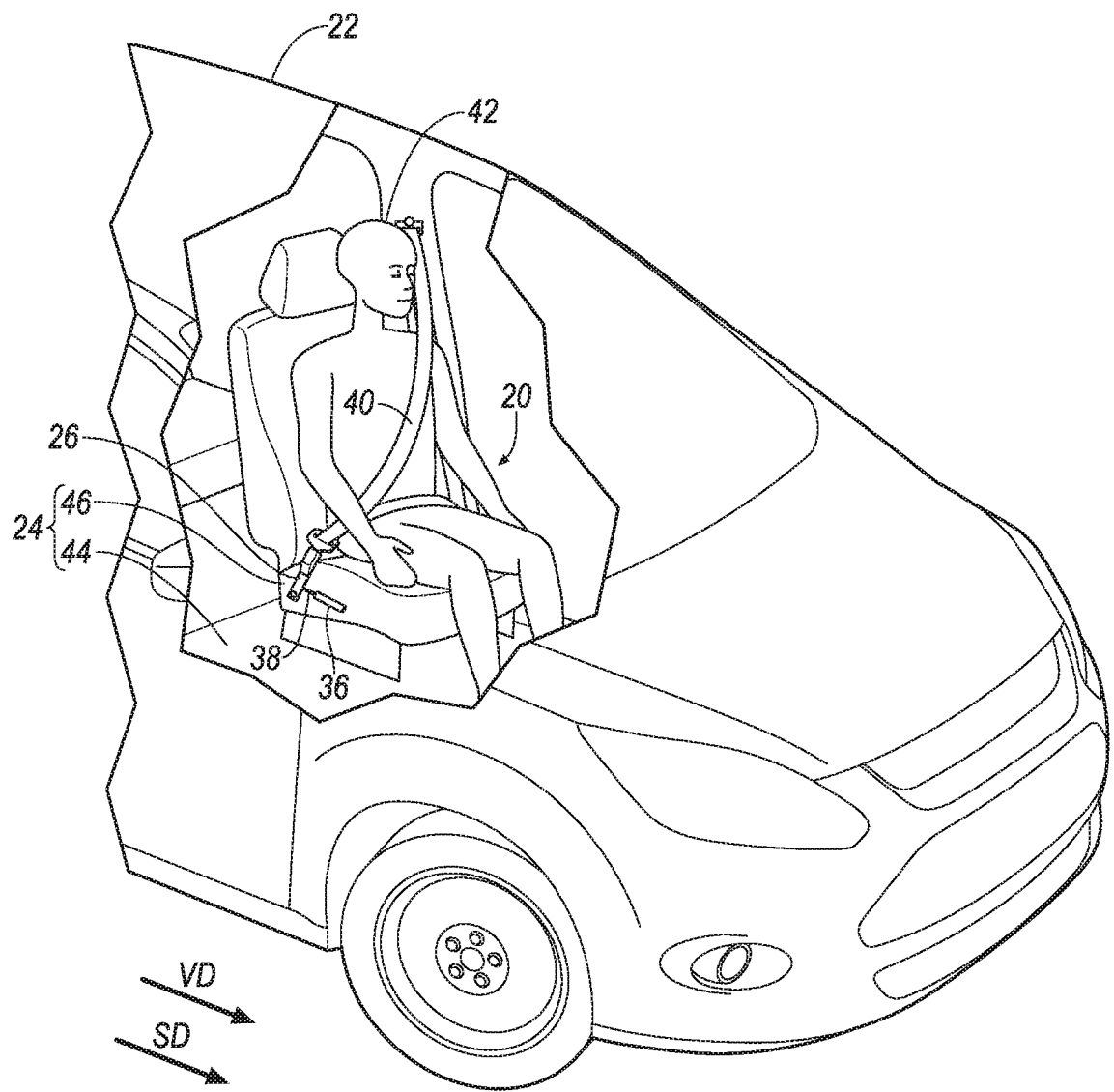
FIG. 1 is a perspective view of a vehicle including a seatbelt assembly.

An assembly includes a base. The assembly includes a seatbelt anchor having a first end defining a circular hole pivotally supported by the base and a second end fixed in position relative to the first end. The assembly includes a buckle fixed in position relative to the second end. The assembly includes a pyrotechnic actuator secured to the base. The assembly includes a connector extending from the pyrotechnic actuator to the seatbelt anchor.

The connector may be a cable securing the pyrotechnic actuator to the base.

The seatbelt anchor may pivot from a first position to a second position that is in a seat-forward direction relative to the first position.

The pyrotechnic actuator may be designed to move the seatbelt anchor from the first position to the second position.

The pyrotechnic actuator may be in a seat-forward direction relative to the seatbelt anchor.

The base may be a vehicle floor.

The base may be a seat.

The seat may include a seat bottom pivotally supporting the seatbelt anchor at the circular hole.

The seat may include a seat bottom, the pyrotechnic actuator secured to the seat bottom.

The seatbelt anchor may be metal.

The assembly may include a processor and a memory storing instructions executable by the processor to actuate the pyrotechnic actuator upon detecting a vehicle impact.

The assembly may include a processor and a memory storing instructions executable by the processor to actuate the pyrotechnic actuator only upon detecting an oblique vehicle impact.

The oblique vehicle impact may include a vehicle impact offset at 15 degrees from a vehicle-forward direction.

The assembly may include a processor and a memory storing instructions executable by the processor to actuate the pyrotechnic actuator upon detecting a vehicle impact offset at 15 degrees from a vehicle-forward direction.

The connector may be fixed to the seatbelt anchor between the first end and the second end.

The seatbelt anchor may be monolithic.

With reference to the Figures, a seatbelt assembly 20 for a vehicle 22 includes a base 24. The seatbelt assembly 20 includes a seatbelt anchor 26 having a first end 28 defining a circular hole 30 pivotally supported by the base 24 and a second end 32 fixed in position relative to the first end 28. The seatbelt assembly 20 includes a buckle 34 fixed in position relative to the second end 32. The seatbelt assembly 20 includes a pyrotechnic actuator 36 secured to the base 24. The seatbelt assembly 20 includes a connector 38 extending from the pyrotechnic actuator 36 to the seatbelt anchor 26.

Pivoting of the seatbelt anchor 26, e.g., with the pyrotechnic actuator 36, moves a webbing 40 of the seatbelt assembly 20 relative to a seat 46, e.g., to relax the webbing 40 across a chest of an occupant 42 restrained by the seatbelt assembly 20 and reduce a likelihood of injury.

The base 24 supports components of the seatbelt assembly 20, e.g., the seatbelt anchor 26 and pyrotechnic actuator 36. For example, the base 24 may be a vehicle 22 floor 44 or the seat 46.

The vehicle 22 may be any passenger or commercial automobile such as a car, a truck, a sport utility vehicle, a crossover vehicle, a van, a minivan, a taxi, a bus, etc. The vehicle 22 may include the seatbelt assembly 20, one or more seats 46, the floor 44, etc. The vehicle 22 defines a vehicle-forward direction VD, e.g., relative to a direction of travel of the vehicle 22 when wheels of vehicle 22 are all aligned in a same direction, relative to a seating position of an operator of the vehicle 22 interacting with control interfaces, e.g., a steering wheel, mounted on an instrument panel of the vehicle 22, etc.

The seat 46 shown in FIGS. 1-5 is a bucket seat, but alternatively the seat 46 may be a bench seat or another type of seat 46.

The seat 46 may include a seat back 48, a seat bottom 50, and a headrest. The headrest may be supported by the seat back 48 and may be stationary or movable relative to the seat back 48. The seat back 48 may be supported by the seat bottom 50 and may be stationary or movable relative to the seat bottom 50. The seat back 48, the seat bottom 50, and/or the headrest may be adjustable in multiple degrees of freedom. Specifically, the seat back 48, the seat bottom 50, and/or the headrest may themselves be adjustable, in other words, adjustable components within the seat back 48, the seat bottom 50, and/or the headrest, and/or may be adjustable relative to each other.

The seat bottom 50 and/or the seat back 48 may include a frame and a covering supported on the frame. The frame may include tubes, beams, etc. The frame may be formed of any suitable plastic material, e.g., carbon fiber reinforced plastic (CFRP), glass fiber-reinforced semi-finished thermoplastic composite (organosheet), etc. As another example, some or all components of the frame may be formed of a suitable metal, e.g., steel, aluminum, etc.

The seat 46 defines a seat-forward direction SD, e.g., relative to a seating position of the occupant 42 of the seat 46, relative to the seat back 45 and seat bottom 50, etc. For example, the seat bottom 50 may extend from the seat back 48 in the seat-forward direction SD. The seat-forward direction SD and the vehicle-forward direction VD may be in a same direction.

The seatbelt assembly 20 may include the seatbelt anchor 26, the webbing 40, a retractor, a latch plate 58, the buckle 34, etc. The seatbelt assembly 20 functions to reduce the likelihood of injury by reducing a force at which the occupant 42 impacts with vehicle 22 interior structures.

The seatbelt anchor 26 secures the webbing 40 relative to the seat 46, e.g., when the latch plate 58 is engaged with the buckle 34. The seatbelt anchor 26 may be a rectangular plate.

The seatbelt anchor 26 includes the first end 28. The seatbelt anchor 26 includes the second end 32. The second end 32 is fixed in position relative to the first end 28, e.g., to prevent relative rotation and/or translation therebetween. The seatbelt anchor 26 may be elongated between the first end 28 and the second end 32. The second end 32 may be spaced from the first end 28. For example, the seatbelt anchor 26 may include an intermediary portion 60 extending from the first end 28 to the second end 32. The seatbelt anchor 26 may be metal, or any other suitable material.

The seatbelt anchor 26 may be monolithic, i.e., a single piece of material with no seams, joints, fasteners, welds, or adhesives holding the seatbelt anchor 26 together. The seatbelt assembly 20 may include additional components connected to and/or extending along the seatbelt anchor 26, e.g., sheaths, covers, etc.; in the example where the seatbelt anchor 26 is monolithic, the seatbelt anchor 26 is monolithic from the first end 28 to the second end 30, and the additional components may extend along an exterior of the seatbelt anchor 26.

The first end 28 of the seatbelt anchor 26 defines the circular hole 30 pivotally supported by the base 24. The circular hole 30 has a substantially circular circumference that allows for the seat belt anchor 26 to rotate relative to the base 24 about the circular hole 30 with substantially no translational movement at the circular hole 30. For example, the first end 28 may be secured to the base 24 with a fastener 62, such as a bolt, or the like that engages the circular hole 30. The fastener 62 and the circular hole 30 may be sized and shaped to allow the circular hole 30 to rotate about the fastener 62 with substantially no translational movement at the interface between the fastener 62 and the circular hole 30. As an example, the fastener 62 may have a circular circumference that is sized to be slip fit within the circular hole 30 so that there is substantially no play between the fastener 62 and the circular hole 30. This configuration allows the seatbelt anchor 26 to pivot about the fastener 62, i.e., to rotate about the fastener 62 with substantially no translational movement at the interface between the fastener 62 and the circular hole 30. "Substantially no translational movement" includes no translation movement between the fastener 62 and the circular hole 30, and includes minor translational movement resulting from loose fit tolerances, wear, etc.

The seatbelt anchor 26 is pivotally supported at the circular hole 30 by the seat bottom 50. For example, the fastener 62 may engage, and be secured to, the frame of the seat bottom 50. A bearing may be disposed between the fastener 62 and the hole 30 to allow for pivoting, i.e., rotation between the fastener 62 and the circular hole 30 with substantially no translational movement. The bearing may create, for example, an interference fit.

Figure 2:
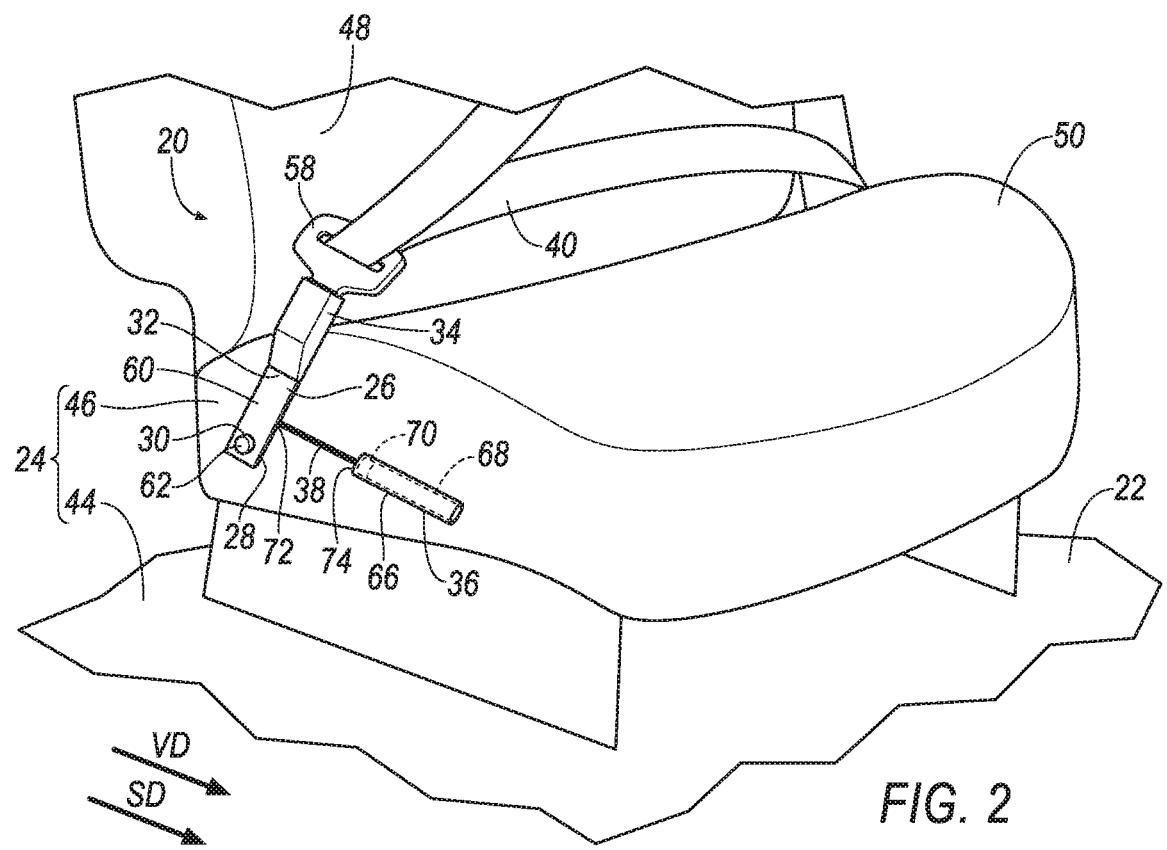
FIG. 2 is a perspective view of a seat and the seatbelt assembly with a seatbelt anchor of the seatbelt assembly in a first position.
Figure 3:
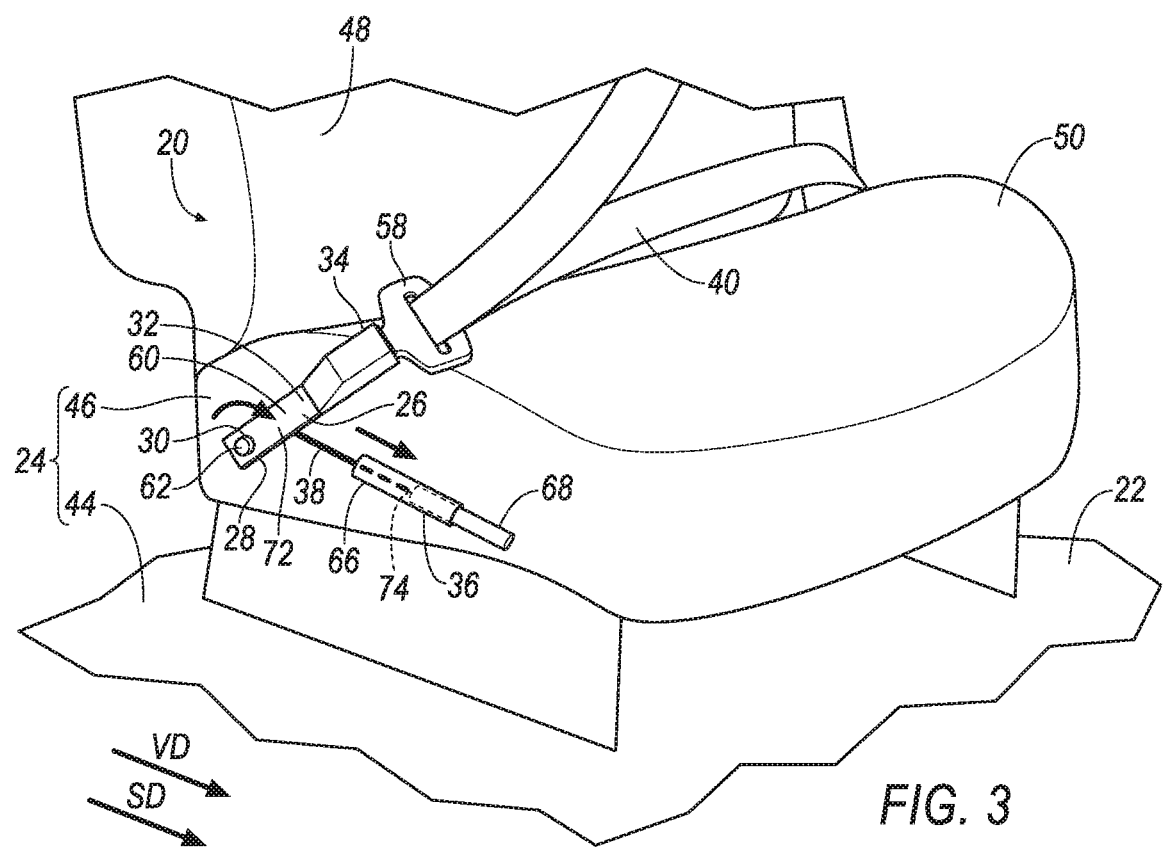
FIG. 3 is a perspective view of the seat and the seatbelt anchor with the seatbelt anchor of the seatbelt assembly in a second position.
Figure 4:
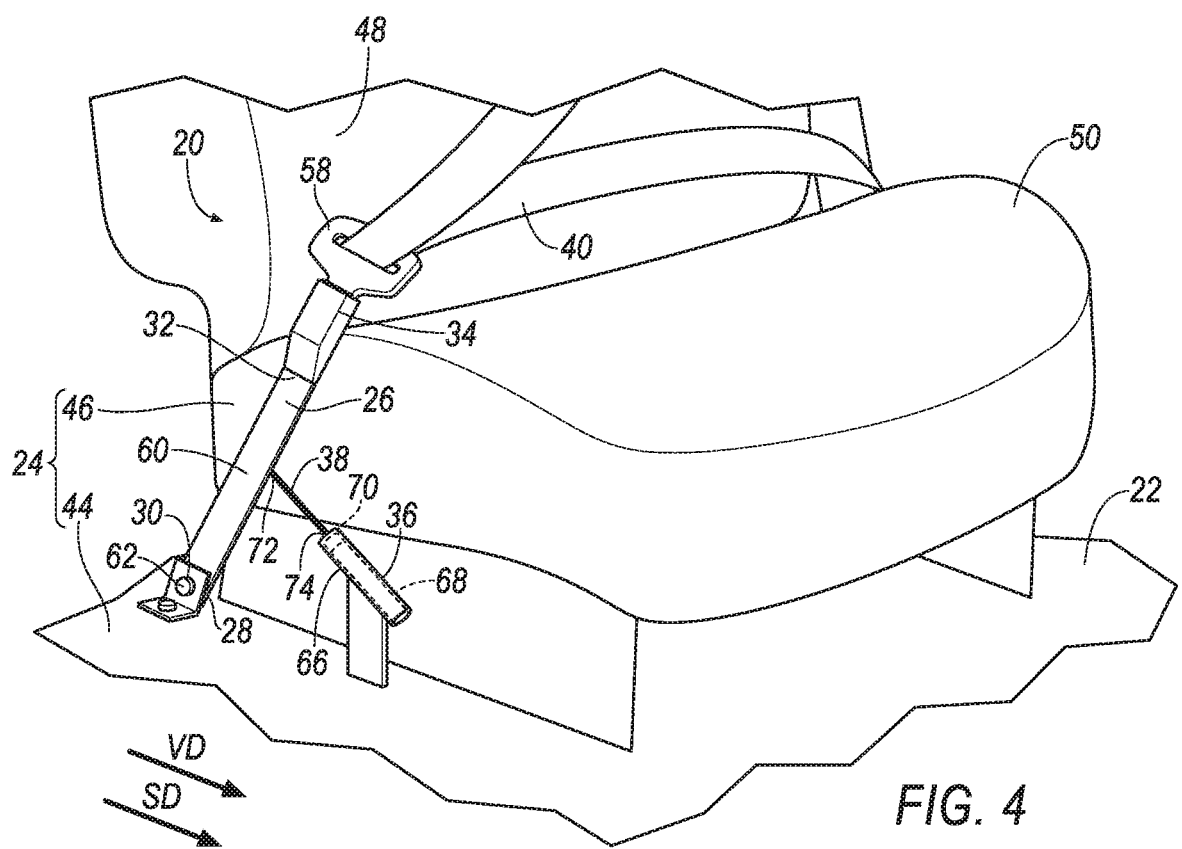
FIG. 4 is a perspective view of another embodiment of the seatbelt anchor of the seatbelt assembly in a first position.
Figure 5:
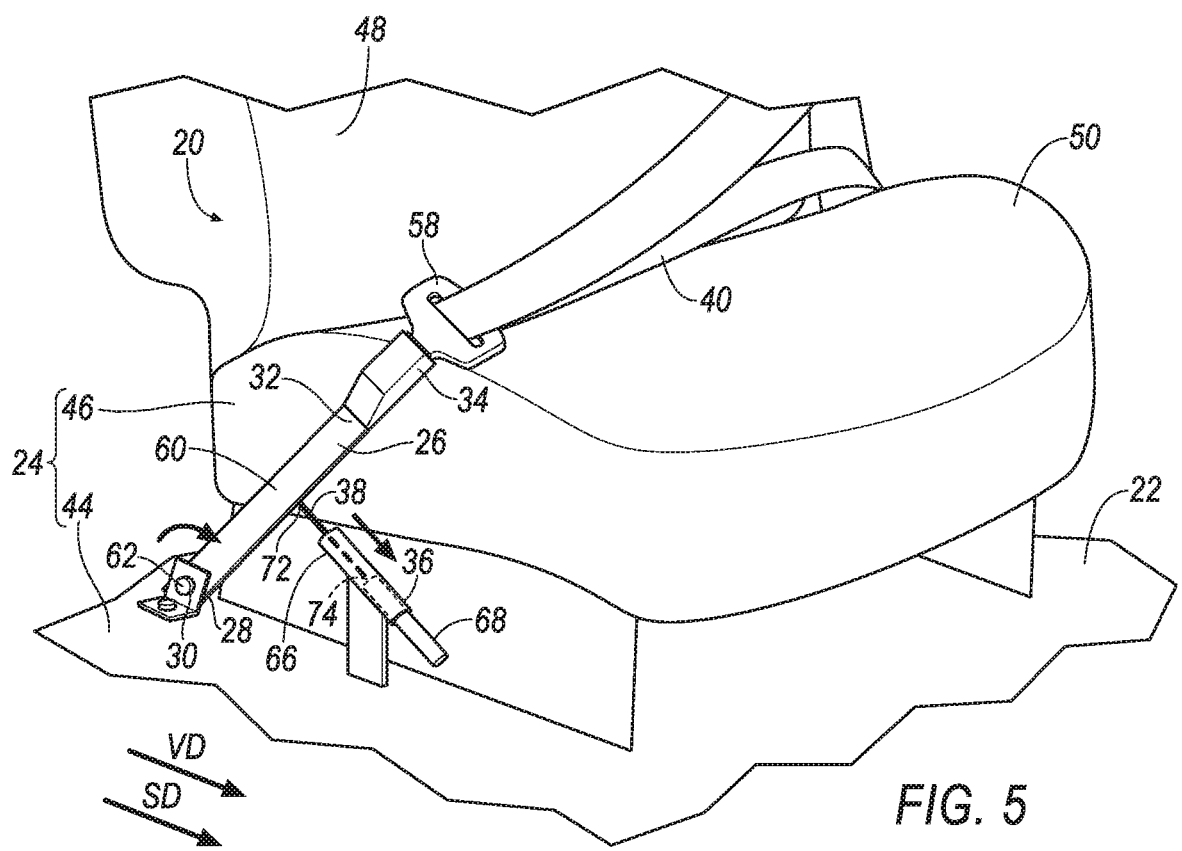
FIG. 5 is a perspective view of the seatbelt anchor of FIG. 4 in a second position.

The seatbelt anchor 26 pivots from a first position, shown in FIGS. 2 and 4, to a second position, shown in FIGS. 3 and 5, e.g., relative to the seat 46 and about the circular hole 30 at the first end 28 of the seatbelt anchor 26. The second position is in the seat-forward direction SD relative to the first position. To put it another way, the second end 32 of the seatbelt anchor 26 is farther from the seat back 48 in the second position than in the first position.

The buckle 34 secures the seatbelt anchor 26 to the webbing 40. For example, the buckle 34 may include a latch mechanism that engages the latch plate 58, e.g., when the latch plate 58 is received by the buckle 34. The latch plate 58 may be secured to the buckle 34, e.g., until the latch mechanism is actuated to release the latch plate 58. For example, the buckle 34 may include a button that actuates the latch mechanism when depressed, e.g., by the occupant 42, to release the latch plate 58.

The buckle 34 is fixed in position relative to the second end 32, e.g., to prevent relative rotation and/or translation therebetween. In other words, the buckle 34 and the second end 32 move together as a unit. The buckle 34 may be fixed to the second end 32 of the seatbelt anchor 26 with one or more fasteners, welding, etc.

The pyrotechnic actuator 36 is designed to move the seatbelt anchor 26 from the first position to the second position, e.g., in response to an instruction from a computer 64. The pyrotechnic actuator 36 may include a cylinder 66 and piston 68. The pyrotechnic actuator 36 may include a pyrotechnic 70, such as a cold-gas inflator, or other pyrotechnic material, that produces gas or otherwise rapidly expand upon actuation, e.g., to move the piston 68 relative to the cylinder 66.

The pyrotechnic actuator 36 is secured to the base 24, e.g., to the seat 46, to the seat bottom 50, to the floor 44, etc. For example, one or more fasteners, welding, etc., may secure the pyrotechnic actuator 36 to the floor 44, the frame of the seat bottom 50, etc. The pyrotechnic actuator 36 may be in the seat-forward direction SD relative to the seatbelt anchor 26. To put it another way, a distance between the seatbelt anchor 26 and the seat back 48 may be less than a distance between the pyrotechnic actuator 36 and the seat back 48, e.g., the seatbelt anchor 26 may be between the seat back 48 and the pyrotechnic actuator 36.

The connector 38 transfers force generated by the pyrotechnic actuator 36 to the seatbelt anchor 26, e.g., to move the seatbelt anchor 26 from the first position to the second position. The connector 38 extends from the pyrotechnic actuator 36 to the seatbelt anchor 26. For example, the connector 38 may include a pair of opposing ends 72, 74. One of the ends 72 of the connector 38 may be fixed to the seatbelt anchor 26. The other end 74 of the connector 38 may be fixed to the pyrotechnic actuator 36. The end 72 of the connector 38 fixed to the seatbelt anchor 26 may be fixed between the first end 28 and the second end 32, e.g., to the intermediary portion 60. The end 74 of the connector 38 fixed to the pyrotechnic actuator 36 may be fixed to the piston 68. The ends 75, 74 of the connector 38 may be fixed with fasteners, welding, etc. The connector 38 may be metal or any other suitable material. The connector 38 may be a cable, a rod, etc.

The retractor may be attached to a component of the vehicle 22, e.g., to one of the pillars, to one of the seats 46, etc. The retractor may be attached in any suitable manner, e.g., with one or more fasteners, etc. The retractor may include a spool. The spool may freely rotate within the retractor. The spool may be adapted to receive the webbing 40, for example, by including a webbing attachment slot and permitting the webbing 40 to wind around the spool. The retractor may include a locking mechanism that inhibits rotation of the spool when the vehicle 22 is subject to deceleration above a threshold amount, e.g., during the impact of the vehicle 22.

The webbing 40 may be formed of fabric in the shape of a strap. The webbing 40 may be attached to the spool, with the webbing 40 wound around the spool. The webbing 40 may be payable from the retractor, e.g., when the spool is not prevented from rotating by the locking mechanism.

The latch plate 58 engages the buckle 34 to position the webbing 40 relative to the occupant 42 of the vehicle 22, e.g., occupying the seat 46. The latch plate 58 may slidably receive the webbing 40, e.g., the latch plate 58 may include a slot with the webbing 40 disposed therein. The latch plate 58 may be secured to the webbing 40, e.g., with one or more fasteners, stitching, etc.

Figure 6:
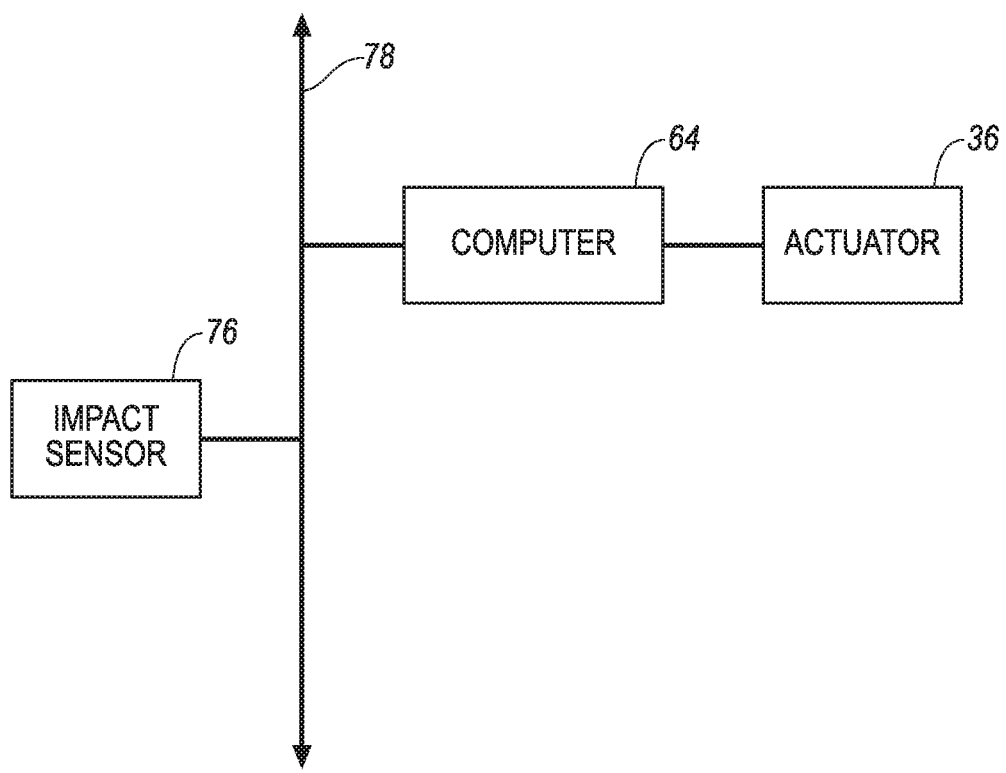
FIG. 6 is a block diagram of a system of the vehicle.

With reference to FIG. 6, The vehicle 22 may include at least one impact sensor 76 for sensing impact of the vehicle 22. The impact sensor 76 is configured to detect an impact to the vehicle 22. The impact sensor 76 may be of any suitable type, for example, post-contact sensors such as accelerometers, pressure sensors, and contact switches; and pre-impact sensor 76s such as radar, LIDAR, and vision-sensing systems. The vision systems may include one or more cameras, CCD image sensors, CMOS image sensors, etc. The impact sensor 76 may be located at numerous points in or on the vehicle 22. Alternatively or additionally to sensing impact, the impact sensor 76 may be configured to sense impact prior to impact, i.e., pre-impact sensing.

The computer 64 may be a microprocessor-based computer 64 implemented via circuits, chips, or other electronic components. For example, the computer 64 may include a processor, a memory, etc. The memory of the computer 64 may include memory storing programming instructions executable by the processor.

The computer 64 and the impact sensor 76 may be connected to a communication bus 78, such as a controller area network (CAN) bus, of the vehicle 22. The computer 64 may use information from the communication bus 78, e.g., from the impact sensor(s) 76, to control the actuation of the pyrotechnic actuator 36. The pyrotechnic actuator 36 may be connected directly to the computer 64, as shown in FIG. 6, or the pyrotechnic actuator 36 may be connected via the communication bus 78.

The computer 64 may be programmed to actuate the pyrotechnic actuator 36 upon detecting a vehicle impact. For example, the computer 64 may identify the vehicle impact based on information received from the one or more impact sensors 76, e.g., via the communication bus 78. Upon identifying the vehicle impact the computer 64 may transmit a command to the pyrotechnic actuator 36, e.g., via the communication bus 78, instructing the pyrotechnic 70 of the pyrotechnic actuator 36 to detonate.

Figure 7:
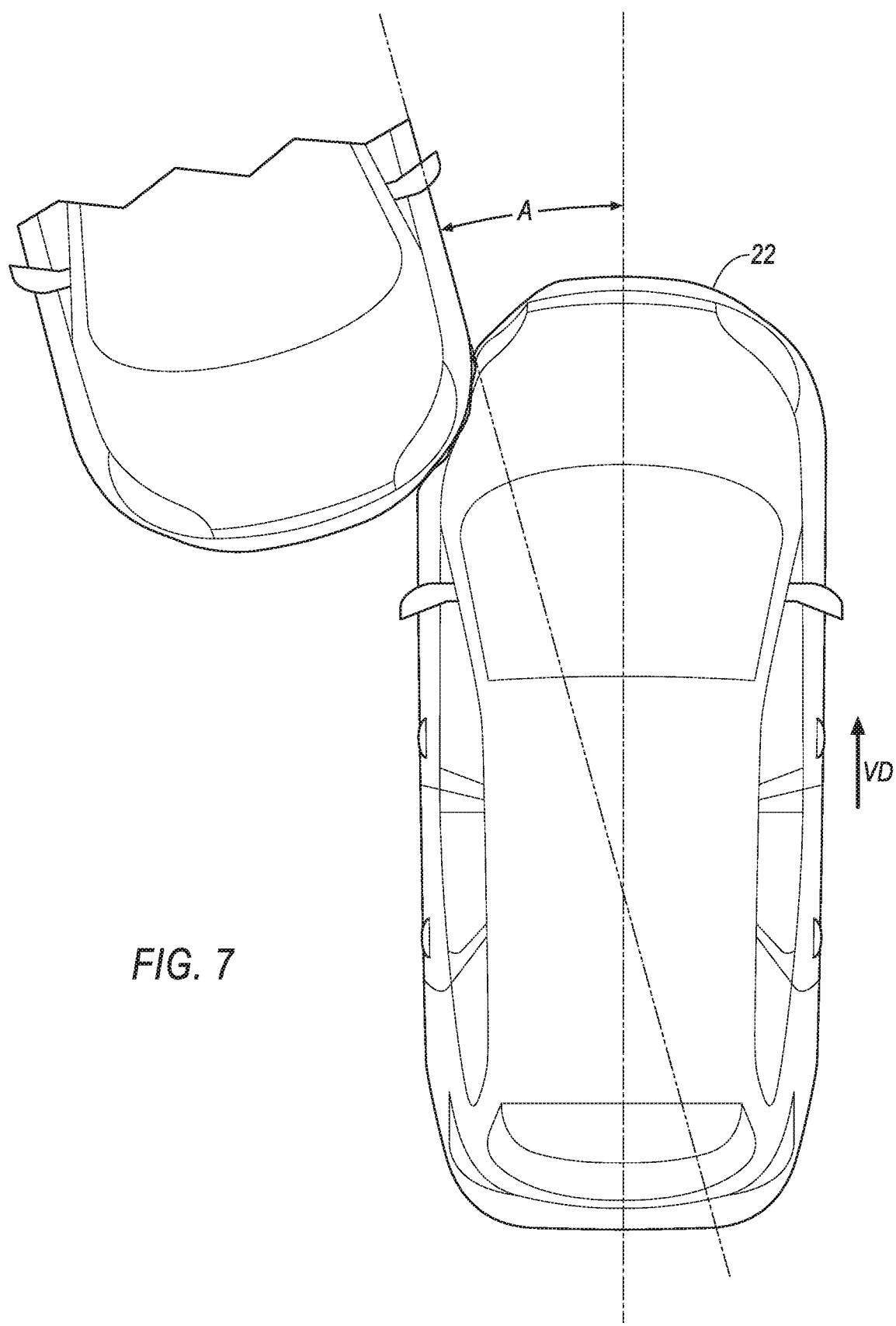
FIG. 7 is a top view of the vehicle experiencing an oblique impact with another vehicle.

The computer 64 may be programmed to actuate the pyrotechnic actuator 36 upon detecting an oblique vehicle impact. The computer 64 may be programmed to actuate the pyrotechnic actuator 36 only upon detecting the oblique vehicle impact. The oblique vehicle impact may be 15-25 degrees offset from the vehicle-forward direction VD. Specifically, the oblique vehicle 22 impact may include a vehicle impact offset at 15 degrees from the vehicle-forward direction VD. For example, the computer 64 may identify the vehicle impact and an angle A, shown in FIG. 7, of such impact, e.g., relative to the vehicle-forward direction VD, based on information received from the one or more impact sensors 76, e.g., via the communication bus 78. Upon identifying the vehicle impact, and upon identifying that the angle A of such impact is 15-25 degrees, e.g., 15 degrees, offset from the vehicle-forward direction VD, the computer 64 may transmit a command to the pyrotechnic actuator 36 instructing detonation of the pyrotechnic 70. Otherwise, the computer 64 may refrain from transmitting such command.

During operation of the vehicle 22, the seatbelt anchor 26 is in the first position. Actuation of the pyrotechnic actuator 36, e.g., in response to detecting the oblique impact, creates tension in the connector 38, which urges the seatbelt anchor 26 to the second position and moves the webbing 40 relative to the occupant 42 to reposition and relax the webbing 40 across a chest of the occupant 42 and reduce a likelihood of injury.

Computing devices, such as the computer 64, generally include computer-executable instructions, where the instructions may be executable by one or more computing devices. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions to perform one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by the computer (e.g., by the processor of the computer 64). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to the processor of the computer 64. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which the computer 64 can read.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. An assembly comprising:
   a seat back;

a seat bottom extending form the seat back in a seat-forward direction;
a base;
a seatbelt anchor having a first end defining a circular hole pivotally supported by the base and a second end fixed in position relative to the first end, the seatbelt anchor pivotable from a first position to a second position that is in the seat-forward direction relative to the first position;
a buckle fixed in position relative to the second end;
a pyrotechnic actuator secured to the base; and
a connector extending from the pyrotechnic actuator to the seatbelt anchor; and
wherein actuation of the pyrotechnic actuator moves the seatbelt anchor from the first position to the second position.

2. The assembly of claim 1, wherein the connector is a cable securing the pyrotechnic actuator to the base.

3. The assembly of claim 1, wherein the pyrotechnic actuator is designed to move the seatbelt anchor from the first position to the second position.

4. The assembly of claim 1, wherein the pyrotechnic actuator is in the seat-forward direction relative to the seatbelt anchor.

5. The assembly of claim 1, wherein the base is a vehicle floor.

6. The assembly of claim 1, wherein the base is fixed to the seat bottom.

7. The assembly of claim 6, wherein the seat bottom pivotally supports the seatbelt anchor at the circular hole.

8. The assembly of claim 6, wherein the pyrotechnic actuator is secured to the seat bottom.

9. The assembly of claim 1, wherein the seatbelt anchor is metal.

10. The assembly of claim 1, further comprising a processor and a memory storing instructions executable by the processor to actuate the pyrotechnic actuator upon detecting a vehicle impact.

11. The assembly of claim 1, further comprising a processor and a memory storing instructions executable by the processor to actuate the pyrotechnic actuator only upon detecting an oblique vehicle impact.

12. The assembly of claim 11, wherein the oblique vehicle impact includes a vehicle impact offset at 15 degrees from a vehicle forward-direction.

13. The assembly of claim 1, further comprising a processor and a memory storing instructions executable by the processor to actuate the pyrotechnic actuator upon detecting a vehicle impact offset at 15 degrees from a vehicle forward-direction.

14. The assembly of claim 1, wherein the connector is fixed to the seatbelt anchor between the first end and the second end.

15. The assembly of claim 1, wherein the seatbelt anchor is monolithic.

* * * * *